(12) United States Patent
Barrientos

(10) Patent No.: US 10,352,488 B2
(45) Date of Patent: Jul. 16, 2019

(54) CONNECTION SYSTEM FOR CONNECTING PEX TUBING TO A FITTING WHICH INCLUDES A CLAMP

(71) Applicant: THC CHILE S.A., Pudahuel, Santiago (CL)

(72) Inventor: Sergio Barrientos, Santiago (CL)

(73) Assignee: THC CHILE S.A., Pudahuel, Santiago (CL)

( * ) Notice: Subject to any disclaimer, the term of this patent is extended or adjusted under 35 U.S.C. 154(b) by 45 days.

(21) Appl. No.: 14/889,107

(22) PCT Filed: Nov. 6, 2014

(86) PCT No.: PCT/CL2014/000059
§ 371 (c)(1),
(2) Date: Nov. 4, 2015

(87) PCT Pub. No.: WO2015/066828
PCT Pub. Date: May 14, 2015

(65) Prior Publication Data
US 2016/0084420 A1    Mar. 24, 2016

(30) Foreign Application Priority Data
Nov. 8, 2013    (CL) .................................. 3210-2013

(51) Int. Cl.
*F16L 33/035*    (2006.01)
*F16L 37/12*    (2006.01)
(Continued)

(52) U.S. Cl.
CPC ............. *F16L 37/12* (2013.01); *F16L 33/035* (2013.01); *F16B 5/0685* (2013.01); *F16L 21/08* (2013.01); *F16L 23/006* (2013.01)

(58) Field of Classification Search
CPC ...................................................... F16L 33/035
(Continued)

(56) References Cited

U.S. PATENT DOCUMENTS 576,119 A * 2/1897 Hess
590,094 A * 9/1897 Duncan .................. F16L 33/03
24/20 S
(Continued)

FOREIGN PATENT DOCUMENTS

DE    2020 06006746    7/2006
WO    WO 2008 028265    3/2008

*Primary Examiner* — James M Hewitt, II
(74) *Attorney, Agent, or Firm* — Shlesinger, Arkwright & Garvey LLP

(57) ABSTRACT

Connection system to connect a tubing with a fitting comprises a tubular fitting including an exterior shoulder and an annular groove disposed a distance away from the shoulder, the tubular fitting is configured to be inserted into the tubing to overlie the groove; a clamp including first and second curved sidewalls, a flexible joint connecting a respective first end of the curved sidewalls, clenching means that connects respective second ends of the curved sidewalls, and an annular flange arranged in an internal region of the curved sidewalls; and the annular flange is disposed over the annular groove when the sidewalls are engaged with the shoulder such that the tubing underneath the annular flange is forced into the annular groove by the annular flange when the clamp is in a clamped position.

16 Claims, 5 Drawing Sheets

(51) Int. Cl.
*F16B 5/06* (2006.01)
*F16L 21/08* (2006.01)
*F16L 23/00* (2006.01)

(58) Field of Classification Search
USPC .................................. 285/242–259
See application file for complete search history.

(56) References Cited

U.S. PATENT DOCUMENTS

| 3,605,200 | A | 9/1971 | Vallinotto et al. |
| 3,925,851 | A | 12/1975 | Bevans |
| 4,003,238 | A | 1/1977 | Oetiker |
| 4,039,210 | A | 8/1977 | Wood et al. |
| 4,291,855 | A | 9/1981 | Schenkel et al. |
| 4,315,348 | A | 2/1982 | Oetiker |
| 4,635,973 | A * | 1/1987 | Sauer .................. F16L 33/22 285/242 |
| 6,155,610 | A * | 12/2000 | Godeau ............ F16L 25/0045 285/242 |
| 6,719,330 | B2 * | 4/2004 | Brown .................. F16L 33/02 285/239 |
| 2004/0090064 | A1 * | 5/2004 | Rowley .................. F16L 33/30 285/256 |
| 2008/0012303 | A1 * | 1/2008 | Poll .................... F16L 33/025 285/256 |
| 2009/0152864 | A1 * | 6/2009 | Olinger .............. B29D 23/003 285/242 |
| 2010/0140926 | A1 * | 6/2010 | Swift .................... F16L 33/20 285/256 |
| 2010/0194099 | A1 * | 8/2010 | Rippstein .......... F16L 37/088 285/242 |
| 2011/0163533 | A1 | 7/2011 | Snyder et al. |

* cited by examiner

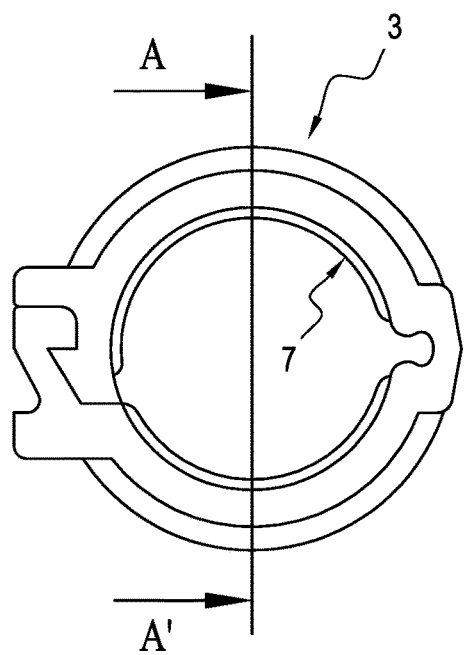
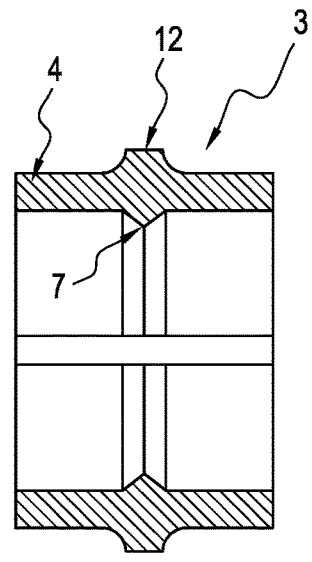
FIG. 5a
A - A'
FIG. 5b
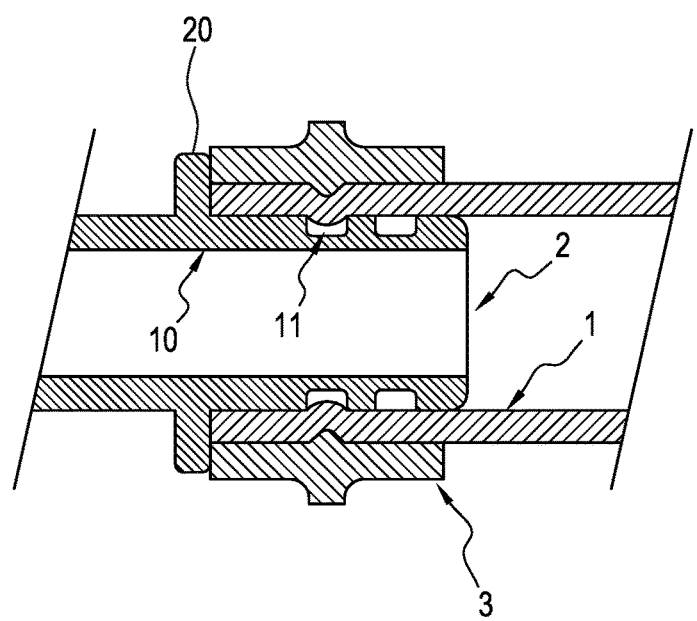
FIG. 6

CONNECTION SYSTEM FOR CONNECTING PEX TUBING TO A FITTING WHICH INCLUDES A CLAMP

RELATED APPLICATIONS

This is a national stage of International PCT Application No. PCT/CL2014/000059, filed on 6 Nov. 2014, claiming priority from Chile Application No. 3210-2013, filed on 8 Nov. 2013, both of which are hereby incorporated by reference.

FIELD OF THE INVENTION

The present invention is related to a connection system, which involves low cost production and installation, to connect a PEX tubing, or similar, with a fitting for PEX tubing, or similar.

BACKGROUND OF THE INVENTION

The cross-linked polyethylene (PEX) tubings offer a series of advantages, such as good mechanical resistance, good temperature resistance, as well as good elastic memory, among others.

Consequently, the connection of PEX tubings with fittings is used in an intensive manner in a series of industries. However, the PEX tubing is of a semi-rigid nature, on account of the connection systems used to connect them with the fittings require that the clamps are capable of applying a considerable force that is stronger than that used for connection to flexible hoses and other types of flexible pipes.

Additionally, it is important to note that, in order to comply with industrial regulations, the standards that should be satisfied are that the connections involving PEX tubings require that the same adequately resist, for example, a continuous operation for 1000 hours constraining water to a temperature of 80° C. and a pressure of 0.7 MPa (100 PSI).

In order to adequately satisfy those standards, the clamps used in the PEX connection should be capable of exerting a quantity of forces within a delimited range. In fact, if the force that the clamp exerted were to be slightly lower than the optimal value, the connection would remain loose, which would impede correct performance of the same (and would not pass the demanding standards previously mentioned). On the contrary, if the force exerted by the clamp were to be slightly higher than optimal value, the connection elements (PEX tubing and polymeric material fittings) would remain subjected to an excessive force that would also impair its performance (since its operational life would be shorter due to material fatigue which would also prevent that it passes the demanding standards previously indicated).

Due to the aforementioned, currently only metal clamps are typically used to connect PEX tubings with fittings, which involves relatively higher costs due to, on one hand for the cost of the metal, and on the other hand to the fact that they require special tools and/or a careful installation that guarantees that the clamps exert an optimum compression (no more and no less).

Additionally, it is important to note that among the systems that use metallic clamps, only the "Oetiker" type of system (for example see documents U.S. Pat. Nos. 4,003, 238 and 4,315,348) has proven to be consistently capable of generating a suitable compression in its clamps, although it requires on one hand, the use of a special (and costly) tool, and on the other hand generates a permanent deformation on the clamp that is transmitted to the tubing.

However, due to the aforementioned, these metallic clamps do not allow that the connection can be disassembled (in the case that it is required to modify it) since during the installation process both the clamp and the tubing suffer high deformation levels that impair reuse.

Notwithstanding the aforementioned, among Prior Art there are connection systems for tubings that involve plastic clamps, although none of these allows generation of a sufficiently strong compression and within a sufficiently delimited range such as to be used in the connection of PEX tubings with their respective fittings.

The document U.S. Pat. No. 3,605,200 reveals a connection system that involves tubular elements and reveals a clamp defined by an arched sidewall, which has clenching elements arranged within the ends that are defined by multiple hooks, which can define multiple levels of compression. Additionally, this document reveals a triple annular flange on the internal surface that is fixed against the hose in a connected position. However, it is important to that this document does not reveal the possibility of disconnecting the clamp. On the other hand, the multiple hooks define multiple clamping positions, which complicates this connection system's ability to consistently reach an optimum pressure (within a delimited range).

The document U.S. Pat. No. 3,925,851 reveals a connection system that involves plastic hoses and a clamp defined by an arched sidewall wherein the ends have arranged clenching elements that are defined by multiple hooks, which can define multiple compression levels. Additionally, this document reveals an annular flange, with a section in a "V," on its inner surface that is fixed against the hose in a connected position. However, it is important to note that this document does not reveal the possibility of disconnecting the clamp. On the other hand, the multiple hooks define multiple clenching positions, which hinders that this connection system can consistently reach an optimum compression (within a delimited range).

On the other hand, in Prior Art there are known systems to support tubings to sidewalls, roofs or other surfaces, that have no relation with a connection system (since these are simply systems for tubing support). With respect to those support systems it is very important to note that they are not oriented in any case to exert such a high pressure as is required in a connection system.

The document U.S. Pat. No. 4,291,855 reveals a support system of tubings that reveal a supporting element defined by an arched sidewall wherein the ends have arranged clenching elements defined by a single hook. However, the compression that this supporting element exerts is clearly low since it does not completely embrace the tubing (which impedes a strong compression). On the other hand, this supporting element can be disconnected because, on one hand, the compression that is exerted is very low (therefore separation of the hooks is not difficult) and on the other hand, there is a significant separation between the superior hook (81) and the element that limits its movement (12) which permits that a screwdriver (or similar) may be introduced (in the separation) to create a disconnection lever.

However, this significant separation would create a serious problem should this element be wanted to be used in a clamp of a connection system since this clamp (due to the significant separation) would not be capable of effectively impeding an excessive compression during installation. The aforementioned, would clearly be detrimental to the performance of the connection since, as the compression involved is very high, any excessive compression would harm both the tubing and the additional connection elements (as mentioned above).

SUMMARY OF THE INVENTION

The present invention is related to a connection system that involves low cost production and installation, to connect a PEX tubing, or similar, with a fitting for PEX tubing, or similar.

In order to achieve the aforementioned, the invention uses a clamp with clenching methods that defined a single clenching position which allows definition of a single level of compression in a reliable manner.

Additionally, the present invention incorporates an annular rib arranged in an internal region of the clamp and aims to fix itself into the tubing to which the clamp is attached, all of which allows a very reliable connection and with a minimum level of deformation to the tubing (which at the same time allows the tubing to be reused in the case that an installation correction should be desired).

On the other hand, the present invention reveals unclenching means that allow the device to easily unclench the clenching means indicated above (despite the fact that the clenching means involve a very high compression), all of which is very convenient when the correction of an hydraulic installation is desired.

The invention additionally reveals capping means that are arranged in a manner to efficiently limit the displacement of the clenching means with the purpose of reliably avoiding that the clamp could exert an excessive compression while being installed.

BRIEF DESCRIPTION OF THE DRAWINGS

FIGS. 5a and 5b show a cross-sectional view of the preferred first modality of the clamp of the invention, wherein the transverse cross-section can be seen more clearly.

FIG. 6 shows a cross-sectional view of the preferred first modality of the clamp of the invention, wherein it also shows the tubing and the fitting opening involved in the connection.

DETAILED DESCRIPTION OF THE INVENTION

Figure 1A:
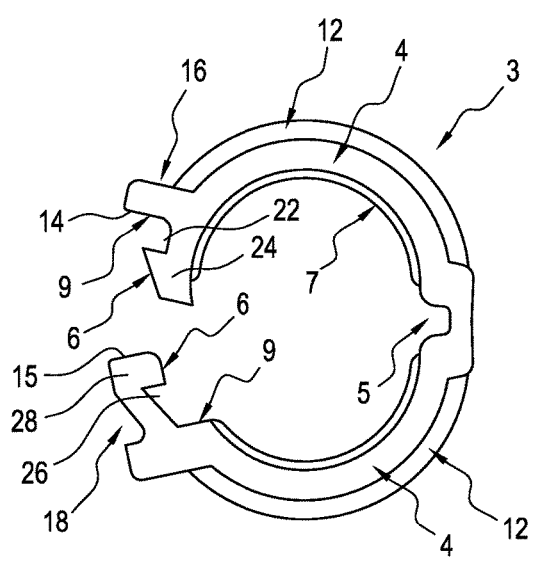
FIGS. 1a and 1b show a preferred first modality of the clamp of the invention in open and closed conditions.
Figure 1B:
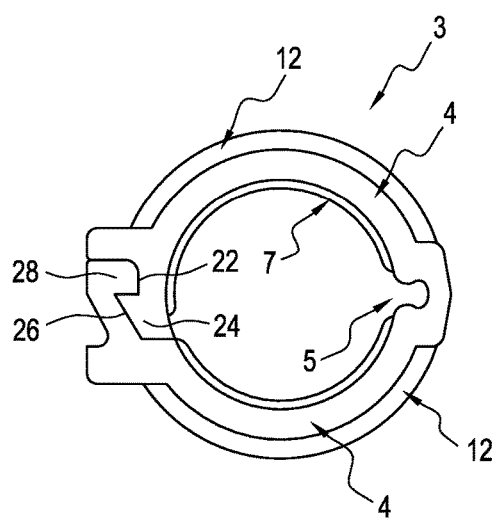
Figure 2A:
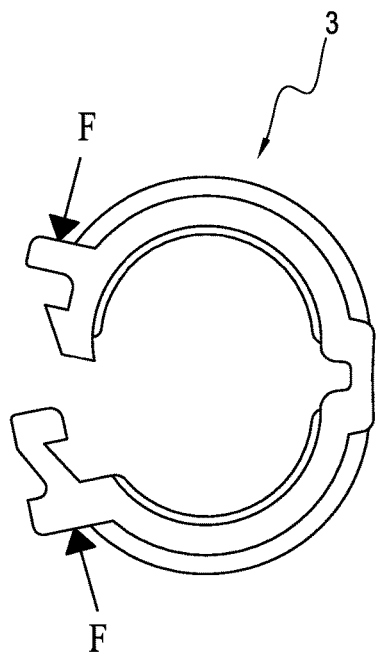
FIGS. 2a and 2b schematically show the force that should be exerted in order to close the clamp in the preferred first modality of the invention.
Figure 2B:
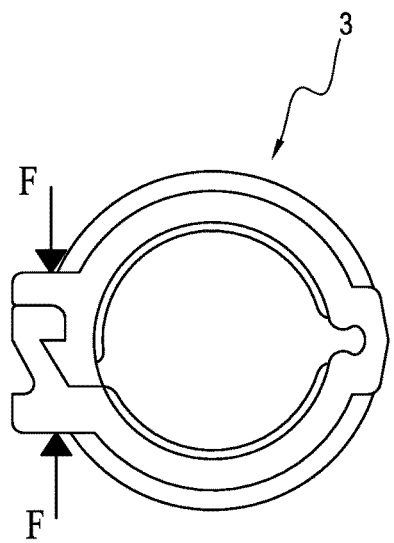
Figure 3A:
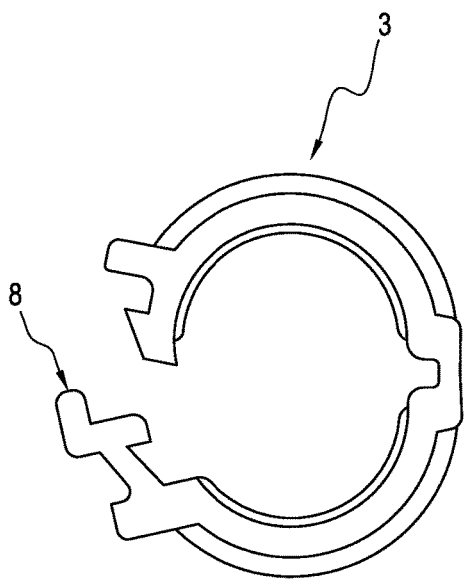
FIGS. 3a and 3b show a preferred second modality of the clamp of the invention in open and closed conditions, wherein means to easily open the clamp are included.
Figure 3B:
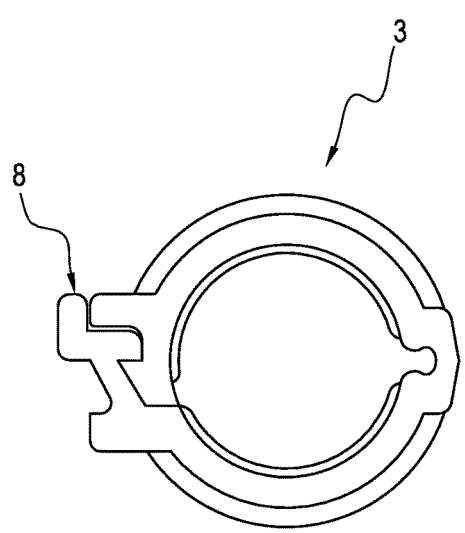
Figure 4A:
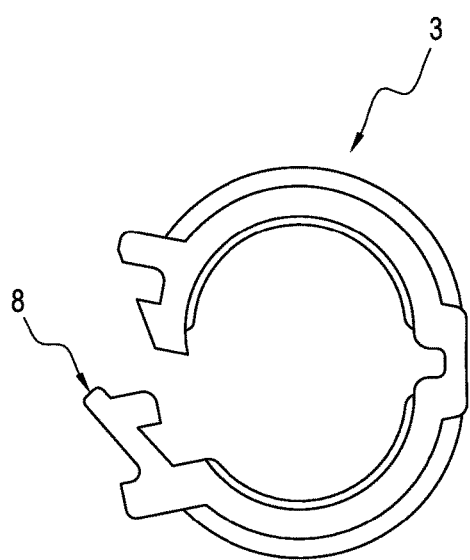
FIGS. 4a and 4b show a preferred third modality of the clamp of the invention in open and closed conditions, wherein means to easily open the clamp are included.
Figure 4B:
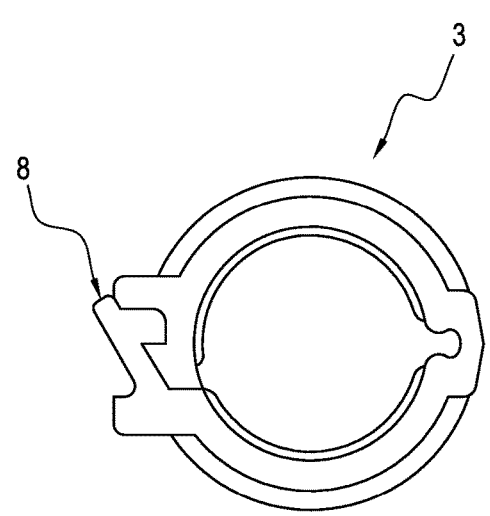
Figure 7:
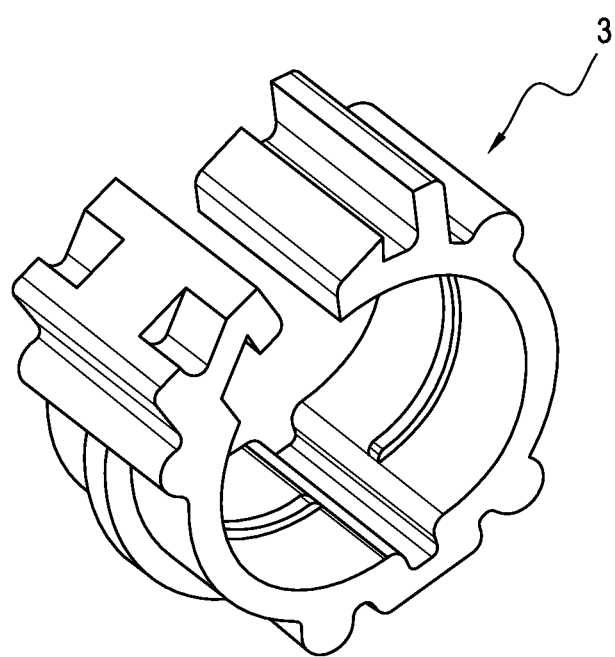
FIG. 7 shows a view in perspective of a fourth preferred modality of the invention which corresponds to a modification of the first modality in that there are incorporated elements of structural reinforcement (which significantly improve the performance of the invention).

The present invention is related with a connection system that involves low cost production and installation, to connect a PEX tubing, or similar, with a fitting for PEX tubing, or similar.

In order to achieve the aforementioned, the system includes a clamp (3) that is comprised of two curved sidewalls (4), a flexible joint (5) that connects a respective first end of the curved sidewalls (4), clenching means (6) that connect a respective second end to the curved sidewalls (4) and that define a single clenching position and consequently a single intensity of the compression force.

The invention additionally includes an annular rib (7) arranged in an internal region of the curved sidewalls (4) which are fixed in the tubing (1) with the purpose of concentrating and increasing the effectiveness of the compression force.

The system may additionally include unclenching means (8), that allow disconnection from the clenching means (6), which is particularly useful when it is desirable to make modifications and/or corrections to a hydraulic line that is being manufactured (or that has been previously manufactured). The unclenching means (8) may correspond to protuberances or exposed cavities in the clenching means (6) to allow that, by means of a screwdriver (or similar), can exert an unclenching lever that does not involve an over-compression of the connection elements (tubing, fitting and clamp). In order to do the latter (to not exert an over-compression) the force exerted by the lever should ideally be perpendicular to the forces that are reciprocally exerted between the hooks (via action and reaction) when they are in a clenched condition.

Additionally, the system may include capping means (9) that are arranged in a manner that limits the displacement of the clenching means (6) with the purpose of avoiding that the clamp (3) exerts an excessive compression force while it is being clenched.

The clenching means (6) can be defined by two hooks 16 and 18 arranged on the curved sidewalls (4), which allows for relatively low production cost to be involved. The hook (16) includes a cavity (22) and a projection (24). The hook (18) includes a cavity (26) and a projection (28). When in the clenched position, the projection (24) is received within the cavity (26) and the projection (28) within the cavity (22).

The capping means (9) may be defined by two surfaces 14 and 15 that press against one another or can be found in close proximity of the hooks when they are in the clenched position, which allows for relatively low production cost to be involved.

The hooks may be arranged in proximity to two respective sidewalls that are oriented in opposite directions and that can be pressed against one another by means of a force (F) to allow the clenching of the hooks, all of which allows that the clenching means can clench with the help of a low-cost tool such as pliers or similar.

The fitting (2) can be comprised of a fitting opening, connected with the tubing (1), defined by a cylindrical region (10) with annular groove (11) in the exterior sidewall. The fitting (2) includes a shoulder (20). This fitting configuration corresponds to the configuration used for excellence in PEX tubings and when used with the clamp of the invention, achieves an extremely strong anchor seeing that the annular rib (7) of the clamp (3) acts in conjunction with the annular groove (11) of the fitting opening.

The curved sidewalls (4) may include a reinforcement annular rib (12) arranged in the respective exterior surfaces of the same, all of which allow reinforcement to the structure of the clamp (3) of the invention minimizing material use.

The clamp (3) can be produced starting from a polymeric material with the purpose of reducing production cost.

The annular rib (7) may have a triangular transverse section with the purpose of concentrating the compression force into a small region.

The invention claimed is:

1. Connection system to connect a tubing with a fitting, comprising:
   a) a tubular fitting including an exterior shoulder and an annular groove spaced and disposed a distance from the exterior shoulder, the tubular fitting is configured to be inserted into an end portion of the tubing such that a part of the end portion overlies the annular groove;
   b) an annular clamp for clamping the end portion of the tubing to the tubular fitting, the annular clamp including a curved sidewall, and a first annular rib disposed on an internal surface of the curved sidewall;
   c) the annular clamp including only a first hook and only a second hook arranged at respective first and second ends of the curved sidewall, the first and second hooks are oriented in opposite directions so that they latch to each other when brought together to an only single clenched position to apply pressure around the end portion of the tubing;
   d) the first annular rib is disposed over the annular groove when the annular clamp is in the only single clenched position around the end portion of the tubing such that the part of the end portion of the tubing is forced into the annular groove by the first annular rib; and
   e) the curved sidewall includes an exterior surface, a second annular rib is disposed on the exterior surface, the second annular rib extends outwardly from the exterior surface, and the second annular rib is aligned with the first annular rib on the internal surface of the curved sidewall.

2. Connection system as in claim 1, wherein:
   a) the first and second hooks include respective first and second surfaces; and
   b) the first and second surfaces press against one another when the annular clamp is being clenched to limit displacement of the first and second hooks and avoid the annular clamp from exerting an excessive torque while the annular clamp is being clenched.

3. Connection system as in claim 1, wherein:
   a) the curved sidewall comprises first and second curved sidewalls having respective first ends and internal surfaces;
   b) a flexible joint connecting the respective first ends of the first and second curved sidewalls; and
   c) the first annular rib comprises first and second sections disposed on the respective internal surfaces of the first and second curved sidewalls.

4. Connection system as in claim 1, wherein the first and second hooks are configured to press one against the other in the single clenched position.

5. Connection system as in claim 1, wherein:
   a) the first hook includes a first cavity that opens outwardly from the first and second curved sidewalls, the first hook includes a first projection adjacent the first cavity, the first projection extends outwardly from the first and second curved sidewalls;
   b) the second hook includes a second cavity that opens inwardly toward the first and second curved sidewalls, the second hook includes a second projection adjacent the second cavity, the second projection extends inwardly toward the first and second curved sidewalls; and
   c) the first projection is received in the second cavity, the second projection is received in the first cavity when the annular clamp is in the clenched position.

6. Connection system as in claim 5, wherein the second projection is removable from out of the first cavity and the first projection is removable from out of the second cavity to open the annular clamp from the single clenched position.

7. Connection system as in claim 1, and further comprising means for unclenching the annular clamp.

8. Connection system as in claim 1, wherein the annular clamp is made from polymeric material.

9. Connection system as in claim 1, wherein the annular clamp and the tubular fitting are configured for a PEX tubing.

10. Connection system as in claim 3, wherein:
    a) the first and second curved sidewalls include respective exterior surfaces; and
    b) the second annular rib comprises first and second sections disposed on the respective exterior surfaces of the first and second curved sidewalls.

11. Connection system to connect a tubing with a fitting, comprising:
    a) a tubular fitting including an exterior shoulder and an annular groove spaced and disposed a distance from the exterior shoulder, the tubular fitting is configured to be inserted into an end portion of the tubing such that a part of the end portion overlies the annular groove;
    b) an annular clamp for clamping the end portion of the tubing to the tubular fitting, the annular clamp including a curved sidewall, and a first annular rib disposed on an internal surface of the curved sidewall; and
    c) the first annular rib is disposed over the annular groove when the annular clamp is in a clenched position around the end portion of the tubing such that the part of the end portion of the tubing is forced into the annular groove by the first annular rib;
    d) the curved sidewall includes an exterior surface, a second annular rib is disposed on the exterior surface, the second annular rib extends outwardly from the exterior surface, and the second annular rib is aligned with the first annular rib on the internal surface of the curved sidewall;
    e) the curved sidewall including first and second ends having first and second hooks, respectively;
    f) the first and second hooks are configured to lock to each other when the annular clamp is in the clenched position to apply pressure around the end portion of the tubing;
    g) the first hook including a first generally U-shaped cavity that opens outwardly from the curved sidewall, the first hook including a first projection adjacent the first generally U-shaped cavity, the first projection extending outwardly from the curved sidewall;
    h) the second hook including a second generally U-shaped cavity that opens inwardly toward the curved sidewall, the second hook including a second projection adjacent the second generally U-shaped cavity, the second projection extending inwardly toward the curved sidewall; and
    i) the first projection is received in the second generally U-shaped cavity, the second projection is received in the first generally U-shaped cavity when the annular clamp is in the clenched position.

12. Connection system as in claim 1, wherein the first annular rib is triangular in cross-section.

13. Connection system as in claim 11, wherein:
a) the curved sidewall comprises first and second curved sidewalls having respective first ends and internal surfaces;
b) a flexible joint connecting the respective first ends of the first and second curved sidewalls; and
c) the first annular rib comprises first and second sections disposed on the respective internal surfaces of the first and second curved sidewalls.

14. Connection system as in claim 13, wherein:
a) the first and second curved sidewalls include respective exterior surfaces; and
b) the second annular rib comprises first and second sections disposed on the respective exterior surfaces of the first and second curved sidewalls.

15. Connection system as in claim 11, wherein the second projection is removable from out of the first cavity and the first projection is removable from out of the second cavity to open the annular clamp from the clenched position.

16. Connection system as in claim 11, wherein the first annular rib is triangular in cross-section.

* * * * *